(12) United States Patent
Jeon et al.

(10) Patent No.: US 11,698,867 B2
(45) Date of Patent: Jul. 11, 2023

(54) USING P2L MAPPING TABLE TO MANAGE MOVE OPERATION

(71) Applicant: Micron Technology, Inc., Boise, ID (US)

(72) Inventors: Seungjune Jeon, Santa Clara, CA (US); Fangfang Zhu, San Jose, CA (US); Juane Li, Milpitas, CA (US); Jiangli Zhu, San Jose, CA (US); Ning Chen, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/458,173

(22) Filed: Aug. 26, 2021

(65) Prior Publication Data

US 2023/0069122 A1  Mar. 2, 2023

(51) Int. Cl.
  *G06F 12/1009*  (2016.01)
(52) U.S. Cl.
  CPC .. *G06F 12/1009* (2013.01); *G06F 2212/7201* (2013.01)
(58) Field of Classification Search
  CPC ......... G06F 12/1009; G06F 2212/7201; G06F 3/0647–065
See application file for complete search history.

(56) References Cited

U.S. PATENT DOCUMENTS

| | | | | |
|---|---|---|---|---|
| 8,966,155 | B1* | 2/2015 | Mulligan | ............ G06F 12/0875 711/163 |
| 2005/0076157 | A1* | 4/2005 | Serizawa | .............. G06F 3/0664 710/1 |
| 2019/0163620 | A1* | 5/2019 | Muthiah | ............... G06F 9/3013 |
| 2020/0081828 | A1* | 3/2020 | Chen | ..................... G06F 3/0679 |
| 2021/0026548 | A1* | 1/2021 | Kang | .................. G06F 12/0246 |

\* cited by examiner

*Primary Examiner* — Chie Yew
(74) *Attorney, Agent, or Firm* — Lowenstein Sandler LLP (57) ABSTRACT

A logical-to-physical (L2P) data structure and a physical-to-logical (P2L) data structure are maintained. The L2P data structure comprises table entries that map a logical address to a physical address. The P2L data structure comprises data entries that map a physical address to a logical address. The P2L data entries also comprise a data move status, a base address, and a boundary indicator. A move operation is detected, wherein the move operation indicates that data referenced by a logical address is to be moved from a source physical address to a destination physical address. Responsive to detecting the move operation, the data move status associated with the source physical address in the P2L data structure is updated.

20 Claims, 6 Drawing Sheets

```
                                    ┌─ 500
                                    ▼
┌─────────────────────────────────────────────────────────────────────────┐
│ Perform a scan of a physical-to-logical (P2L) data structure of a memory sub- │
│ system, wherein the P2L data structure comprises one or more P2L entries,     │
│ wherein the P2L entries map a physical address identifying a super management │
│ unit (SMU) on a memory device to a corresponding logical address, and wherein │
│        the P2L entries comprises a data move status and a boundary indicator. │
│                                    510                                        │
└─────────────────────────────────────────────────────────────────────────┘
                                    │
                                    ▼
┌─────────────────────────────────────────────────────────────────────────┐
│ Responsive to identifying, in the P2L data structure, a first entry comprising a first │
│ data move status indicating that the first entry is associated with an SMU move as │
│ a destination physical SMU (PSMU), identify a first boundary indicator associated │
│                              with the first entry.                             │
│                                    520                                         │
└─────────────────────────────────────────────────────────────────────────┘
                                    │
                                    ▼
┌─────────────────────────────────────────────────────────────────────────┐
│ Identify a plurality of management units (MU) referenced by the SMU, wherein │
│    each MU in the plurality of MUs comprises a second boundary indicator.    │
│                                    530                                        │
└─────────────────────────────────────────────────────────────────────────┘
                                    │
                                    ▼
┌─────────────────────────────────────────────────────────────────────────┐
│ Identify, among the plurality of MUs, a subset of MUs having a respective second │
│          boundary indicator not matching the first boundary indicator.          │
│                                    540                                          │
└─────────────────────────────────────────────────────────────────────────┘
                                    │
                                    ▼
┌─────────────────────────────────────────────────────────────────────────┐
│              Perform the SMU move for each MU of the subset of MUs.           │
│                                    550                                        │
└─────────────────────────────────────────────────────────────────────────┘
```

FIG. 5

FIG. 6

USING P2L MAPPING TABLE TO MANAGE MOVE OPERATION

TECHNICAL FIELD

Embodiments of the disclosure relate generally to memory sub-systems, and more specifically, relate to metadata management for ungraceful shutdown of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to metadata management for ungraceful shutdown of a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data." A host request can include a logical address (e.g., a logical block address (LBA) and namespace) for the host data, which is the location that the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (specifying which LBAs contain valid data), etc.

In order to isolate, from the host system, various aspects of physical implementations of memory devices employed by memory sub-systems, the memory sub-system can maintain a data structure that maps each logical address to a corresponding physical address. In some implementations, the physical address can include channel identifier, die identifier, page identifier, plane identifier and/or frame identifier. This mapping data structure is referred to herein as a logical-to-physical (L2P) table. The memory sub-system can also maintain a data structure that maps each physical address to a logical address. This mapping data structure is referred to herein as a physical-to-logical (P2L) table. The P2L and L2P tables collectively are referred to herein as address mapping data structures.

With some types of memory devices (e.g., NAND), pages can be grouped to form blocks. Some types of memory devices, such as 3D cross-point, can group pages across dice and channels to form management units. Accordingly, each entry of the address mapping data structures can reference a management unit (MU), which includes one or more pages (e.g., a set of pages crossing channel, die, and/or partition) that are grouped together for management purposes. Additionally, in some types of memory devices (e.g., 3D cross-point), management units can be grouped together to form super management units (SMUs). Hence, the address mapping data structures can map physical SMUs (PSMUs) to logical SMUs (LSMUs), and LSMUs to PSMUs.

The address mapping data structures are maintained by the firmware of the memory sub-system controller and are stored on one or more non-volatile memory devices of the memory sub-system. In order to improve the overall efficiency of data transfer between a host system and a memory sub-system, the address mapping data structures can at least partially be cached by one or more volatile memory devices of the memory sub-system. In some memory sub-systems, in order to maintain data integrity, the address mapping data structures stored on one or more volatile memory devices are periodically stored on, or copied to, on a non-volatile memory device. The process of storing the address mapping data structures to a non-volatile memory device can be referred to as a metadata dump. Any mapping updates performed between metadata dumps are not stored on the non-volatile memory device, which can lead to potential data loss in the event of an ungraceful shutdown.

An ungraceful shutdown results from the shutting down (or powering off) of the memory sub-system without following a predefined shutdown procedure. The predefined shutdown procedure can include operations to ensure data integrity. For example, part of the predefined shutdown procedure can include ensuring that data stored in volatile memory is written to non-volatile memory. For example, system metadata (including the address mapping data structures) can be maintained in volatile memory (e.g., in a cache), and can be occasionally written to non-volatile memory. If an ungraceful shutdown occurs before the system metadata is written to non-volatile memory, a recovery process can be executed at the next power-up event to recover any lost metadata. For example, the recovery process can include scanning the metadata overhead of a physical address stored on the non-volatile memory device to reconstruct the physical to logical mapping information.

As an example, for some memory devices in a memory sub-system (e.g., NAND), the access unit of the memory device can be 4 kilobytes. A physical address can identify a page in a memory device, and a page can store 4 kilobytes of host data, plus an overhead byte (or so) of data to store metadata for the host data, including, for example, error handling data (e.g., ECC codeword, parity code), data versions, valid bitmap, etc. The page referenced by the physical address can store the associated logical address as part of the metadata overhead. Some memory sub-systems can access the physical address on the non-volatile memory device to determine whether the mapping data structures are valid following an ungraceful shutdown, and further can use reconstruct the mapping data structures using the metadata overhead.

Some memory devices within the memory sub-system are not byte-addressable. For example, some memory devices (e.g., 3D cross-point) have an access unit of 64 bytes. These memory devices do not have sufficient storage space to store as much metadata overhead as memory devices with an access unit of 4 kilobytes. That is, if each physical address references 64 bytes of data, using an additional byte for each physical address to store metadata overhead would result in more space used to store overhead than to store actual data. As such, some memory sub-systems cannot rely on the metadata overhead to reconstruct valid mapping data structures following an ungraceful shutdown. Furthermore, frequent metadata dumps can reduce performance and negatively affect the quality of service of the memory sub-system.

Aspects of the present disclosure address the above and other deficiencies by having a memory sub-system that manages address mapping data structures in a manner preventing data loss in the event of an ungraceful shutdown. The memory sub-system controller stores a physical-to-logical (P2L) table on a volatile memory device, and uses it as the main mapping data structure between physical addresses and logical addresses for a particular memory device. The metadata management system also stores a logical-to-physical (L2P) table on a volatile memory device. In order to maintain system metadata integrity, the metadata management system stores back-ups or copies of the P2L and L2P tables on a non-volatile memory device within the memory sub-system. In the event of an ungraceful shutdown, the metadata management system can rely on the L2P and P2L tables stores on the non-volatile memory device to recover any data that may have been lost as a result of the ungraceful shutdown.

In order to ensure metadata integrity, the P2L and L2P tables stored on the volatile memory device should match the P2L and L2P tables stored on the non-volatile memory device. At times, the memory sub-system controller performs media management operations to manage the physical wear on the memory devices and lengthen the overall lifetime of the memory sub-system. For example, the memory sub-system controller can perform a media management operation (e.g., a wear leveling operation) to distribute the physical wear across data units of a memory device. The media management operation can include moving data from one (source) physical address on a memory device to another (destination) physical address. Moving data from the source physical address to the destination physical address involves updating the P2L and L2P tables to ensure that the logical address is pointing to the correct physical address (i.e., following the move, updating the logical address to point to the destination physical address). During the data move, the L2P and P2L tables on the volatile memory device may not match the L2P and P2L tables on the non-volatile memory device, which can lead to data loss in the event of an ungraceful shutdown. In such an event, the metadata management system can ensure that the tables on the non-volatile memory device can be restored and that no data is lost.

In order to ensure that the tables on the non-volatile memory device can be restored, the metadata management system can store a move status in the P2L table entry associated with the source physical address. The move status can indicate whether the P2L table entry is associated with an ongoing data move, and whether the physical address specified by the P2L table entry is a source physical address or a destination physical address. The metadata management system can further store a boundary indicator associated with each physical address. The boundary indicator can be a one-bit data field, and can be used to keep track of which data have been physical moved from the source physical to the destination physical address. For example, the boundary indicator can be "0" if the data referenced by the table entry have been moved to the destination address, and can be "1" if the data has not been moved. In some implementations, a boundary indicator of "1" indicates that the data has been moved and "0" indicates that it has not been moved. Following an ungraceful shutdown, the metadata management system can identify the boundary indicator, and can resume the move operation starting from the identified boundary indicator indicates that the data referenced by a physical address has not been moved yet. The metadata management system can update the mapping of the destination physical address in the P2L table to point to the logical address, and further update the status associated with the destination physical address table entry in the P2L table.

The metadata management system can cause the data to be moved by copying the data from a source physical address to a destination physical address. After the move, the metadata management system can update the L2P table on both volatile and the non-volatile memory devices to reflect the data move. That is, the logical address associated with the moved data now points to the destination physical address. The metadata management system can then update, on both the volatile and non-volatile memory devices, the P2L table entry associated with the source physical address. The metadata management system can un-map the source physical address and update the move status associated with the source physical address to indicate that it is no longer involved with a data move. In one example, the metadata management system can un-map the source physical address by updating the source physical address table entries in both the P2L and L2P tables to a default value. The default value can be randomly generated, or can be a predefined value that indicates to the memory sub-system that the table entry is un-mapped. Finally, the metadata management system can update the move status associated with the destination physical address to indicate that it is no longer involved with a data move operation, on both the volatile and non-volatile memory devices.

Following an ungraceful shutdown, at power-up, the metadata management system can use the P2L and L2P tables stored on the non-volatile memory devices to determine whether the ungraceful shutdown occurred during a data move operation. The metadata management system can scan the P2L table to identify a table entry with the move status indicating that it is involved in a data move. Such a status indicates that an ungraceful shutdown occurred during a data move. The metadata management system can then use the boundary stored in the P2L table to complete the data move operation.

Advantages of the present disclosure include, but are not limited to, improved performance of the memory sub-system by avoiding metadata dump operations in which the entire metadata data structures are copied to non-volatile memory devices. By keeping the system metadata up to date on both the volatile and non-volatile memory devices, the memory sub-system does not need to consume large amounts of resources to perform a metadata dump. Furthermore, aspects of the present disclosure do not require significant metadata overhead stored in each physical address, while maintaining system metadata integrity in the event of an ungraceful shutdown.

Figure 1:
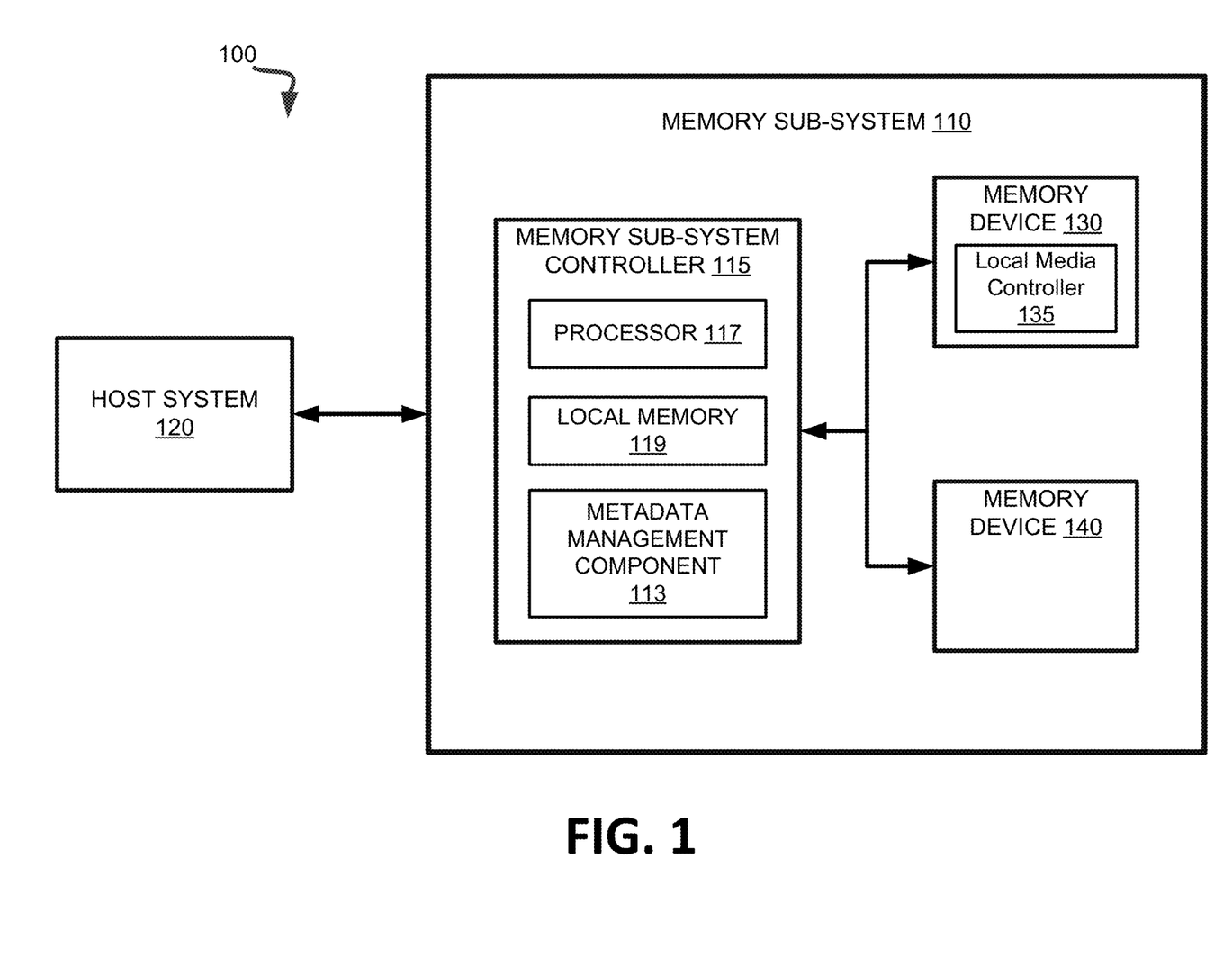
FIG. 1 illustrates an example computing system that includes a memory sub-system, in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs).

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a metadata management component 113 that can ensure a valid address mapping of system metadata in the event of an ungraceful shutdown. In some embodiments, the memory sub-system controller 115 includes at least a portion of the metadata management component 113. In some embodiments, the metadata management component 113 is part of the host system 110, an application, or an operating system. In other embodiments, local media controller 135 includes at least a portion of metadata management component 113 and is configured to perform the functionality described herein.

The metadata management component 113 can manage the address mapping data structures associated with the non-byte-addressable memory devices in the memory sub-system to ensure valid L2P and P2L mapping following an ungraceful shutdown. The metadata management component 113 can maintain address mapping data structures (i.e., P2L and L2P tables) on both volatile and non-volatile memory devices.

In some embodiments, the memory sub-system controller 115 can perform a move operation, for example, to execute a media management operation. The metadata management component 113 can detect the move operation. The move operation can include moving data, referenced by a logical SMU, from a source physical SMU to a destination SMU. In addition to mapping the PSMU to LSMU, the address mapping data structures can include data fields used by the metadata management component 113 to keep track of the move operation. For example, the metadata management component 113 can update a move status data field for the source PSMU to indicate that the LSMU referenced by the source PSMU is involved with a move operation. The address mapping data structures are further described with respect to FIG. 2 below.

In some embodiments, the metadata management component 113 can use the P2L table stored on the non-volatile memory device (e.g., memory device 130) to reconstruct a valid mapping following an ungraceful shutdown. For example, the metadata management component 113 can use the data fields (e.g., the move status data field) to determine whether an LSMU referenced by a PSMU was involved with a move operation at the time of the ungraceful shutdown. The metadata management component 113 can then use the data fields in the P2L to reconstruct a valid mapping. Further details with regards to the operations of the metadata management component 113 are described below.

Figure 2:
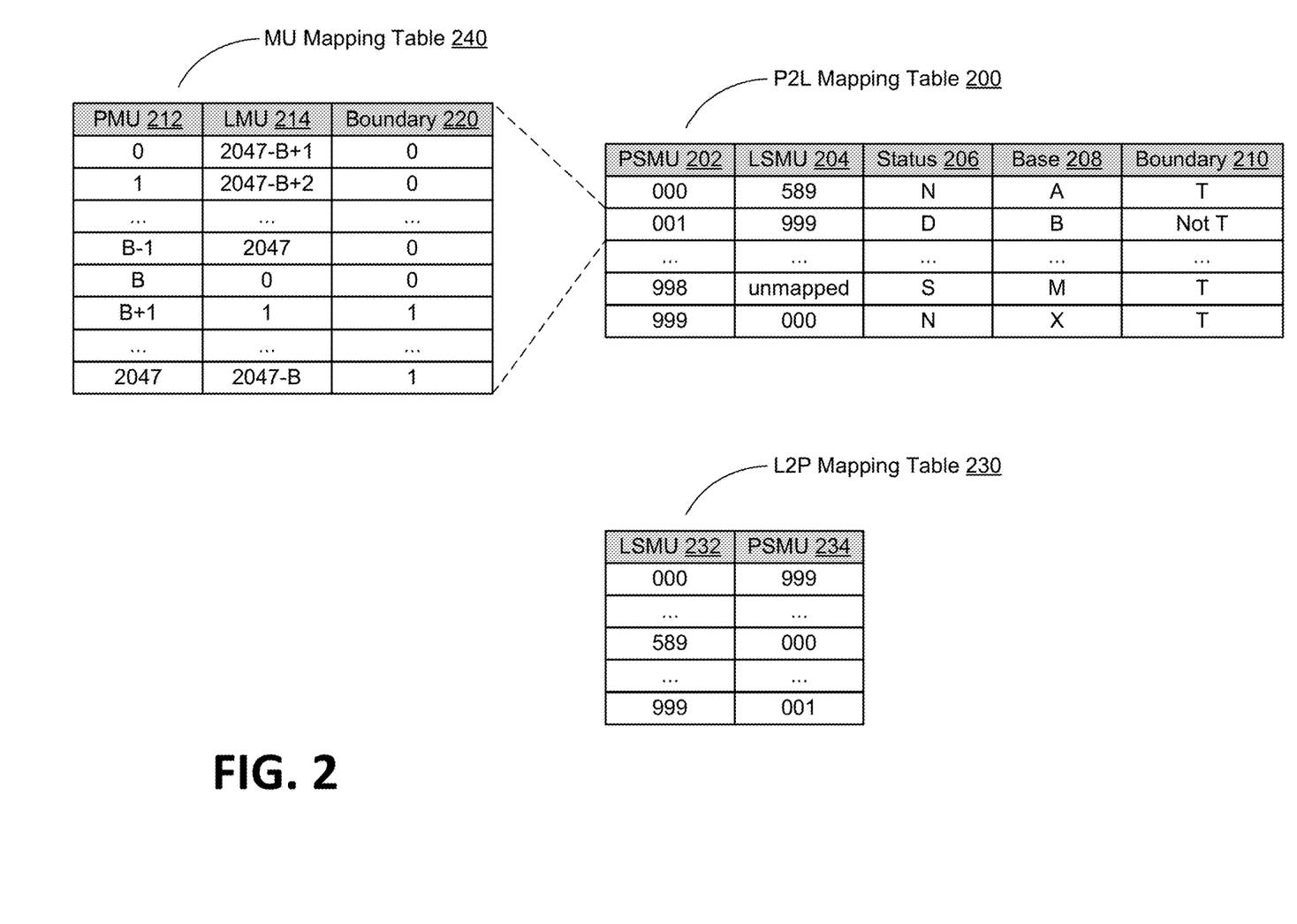
FIG. 2 illustrates a physical-to-logical mapping table, a logical-to-physical mapping table, and a management unit mapping table, in accordance with some embodiments of the present disclosure.

FIG. 2 illustrates a P2L mapping table 200, an L2P mapping table 230, and a management unit mapping table 240, in accordance with some embodiments of the present disclosure. In embodiments, the metadata management component 113 of FIG. 1 can maintain the P2L mapping table 200 and the L2P mapping table 230 on one or more volatile memory devices, e.g., in a cache of memory device 140 of FIG. 1, and on one more non-volatile memory devices, e.g., memory device 130 of FIG. 1. In some embodiments, the MU mapping table 240 is not stored by the memory sub-system, and is illustrated in FIG. 2 for explanation purposes.

In embodiments, the P2L mapping table 200 can map a PSMU 202 to a LSMU 204. The P2L mapping table 200 entries can also include a move status 206, a base 208, and a boundary 210. In embodiments, the status 206 can be a 2-bit data field and can indicate whether the table entry is involved in an ongoing SMU move operation. For example, a status 206 entry "N," which can be stored as "00," can indicate that the PSMU 202 table entry is not associated with an SMU move; a status 206 entry "D," which can be stored as "01," can indicate that the PSMU 202 table entry is associated with an ongoing SMU move as the destination PSMU; a status 206 entry "S," which can be stored as "10," can indicate that the PSMU 202 table entry is associated with an ongoing SMU move as the source PSMU.

The base 208 can represent the base offset for the MU mapping table 240. As noted above, the MU mapping table 240 is illustrated for explanation purposes and may not be stored by the memory sub-system. In embodiments, each PSMU can reference a group of MUs. For example, as illustrated in FIG. 2, PSMU entry "001" presents the group of MUs in MU mapping table 240. MU mapping table 240 can include 2048 entries, and can include a physical MU (PMU) 212 field mapped to a logical MU (LMU) 214 field, as well as a boundary 220 field. In embodiments, a PMU can be the same as a PBA, and an LMU can be the same as an LBA. The base offset 208 is used to refer to which PMU 212 is mapped to LMU 214 "0," i.e., the base PMU-LMU mapping. In some embodiments, in order to ensure proper wear leveling of a memory device, the base PMU-LMU mapping can change. That is, rather than repeatedly starting the storage of data on a memory device at the same PMU, a memory sub-system can change the starting PMU address. By storing a base 208 in the P2L mapping table 200, the memory sub-system controller 115 can avoid storing the MU mapping table 240 altogether. The memory sub-system controller 115 can reconstruct the MU mapping table 240 using the base 208 address, as illustrated in FIG. 2.

In some embodiments, there is an additional level of groupings of MUs called stripes (not illustrated). For example, a stripe mapping table can group multiple PMUs into one stripe (e.g., 2048 MUs per stripe), and can store a boundary indicator for each stripe. In embodiments in which the MUs are grouped into stripes, the MU mapping table 240 is not stored in the memory sub-system, but rather a stripe mapping table (not illustrated) is stored. The stripe mapping table stored a boundary indicator for each stripe, e.g., either a "0" or "1." However for explanatory purposes, the MU mapping table 240 stores the boundary indicator for each PMU 212 in the SMU.

The boundary 210 in the P2L mapping table 200 can be used to keep track of whether a mapping in the MU mapping table 240 has been updated according to the SMU move. For example, before moving any data from the source PMU to the destination PMU, the metadata management component 113 can flip the boundary indicator 210. That is, the metadata management component 113 can reverse the boundary 210 to indicate that the data referenced by a PSMU 202 has moved. In an example, PSMU 202 entry "001" can be associated with an SMU move operation, and the metadata management component 113 can update the boundary 210 from "T" to "Not T." In embodiments, "T" can be "1" and "Not T" can be "0."

During the SMU operation, the metadata management component 113 can read the data referenced by each PMU 212 table entry and move the data to the source PSMU (according to the SMU move operation). The metadata management component 113 can perform this move one PMU 212 table entry at a time. After (or while) each PMU table entry move, the metadata management component 113 can update the boundary 220 of the PMU table entry in the MU mapping table 240 by reversing the binary value of the boundary 220 to indicate that the data has been moved (e.g., changing a "0" to a "1" or vice versa). To continue the example above (as illustrated in FIG. 2), the PMU entries in MU mapping table 240 with a boundary 220 of "0" can indicate that the data referenced by those PMU 212 table entries have been moved according to the SMU move, and the entries with a boundary 220 of "1" can indicate that the data referenced by those PMU 212 table entries have not been updated according to the SMU move.

The L2P mapping table 230 can map LSMU 232 to PSMU 234. Details about how the metadata management component 113 updates the tables to ensure system metadata integrity in the event of an ungraceful shutdown is further described below.

Figure 3:
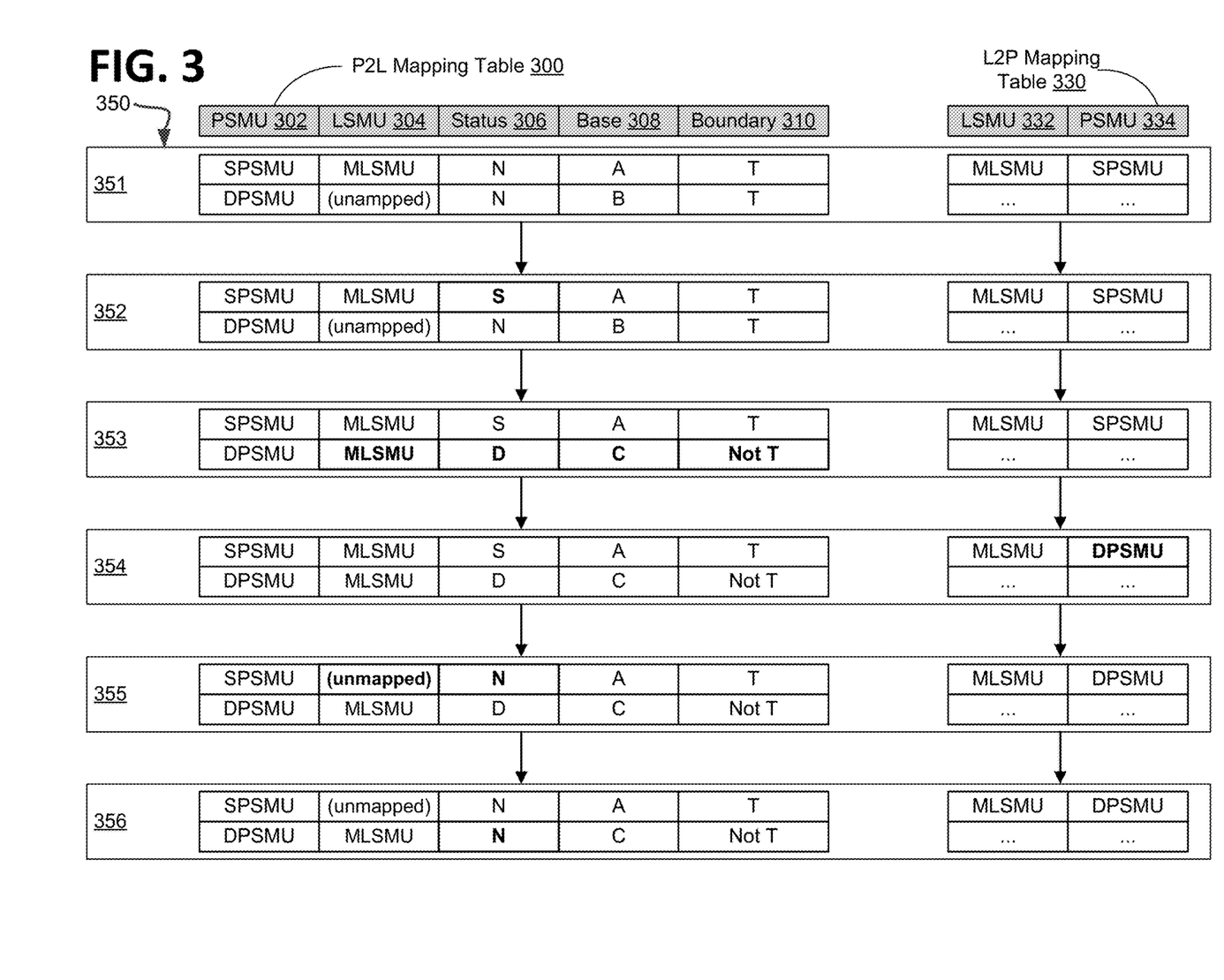
FIG. 3 depicts a block diagram illustrating an implementation of a method executed by a computer system for updating metadata tables for an ungraceful shutdown, in accordance with some embodiments of the present disclosure.

FIG. 3 depicts a block diagram illustrating an implementation of a method 350 executed by a computer system for updating metadata tables for an ungraceful shutdown, in accordance with some embodiments of the present disclosure. The method 350 can be implemented by computing system 100 of FIG. 1. In some embodiments, P2L mapping table 300 can be the same as P2L mapping table 200 of FIG. 2, and L2P mapping table 330 can be the same as L2P mapping table 230 of FIG. 2. In embodiments, the P2L mapping table 300 and the L2P mapping table 330 can be stored on one or more volatile memory devices, such as memory device 140 of FIG. 1. Furthermore, the P2L mapping table 300 and the L2P mapping table 330 can be stored on one or more non-volatile memory devices, such as memory device 130 of FIG. 1. Metadata management component 113 of FIG. 1 can implement method 350.

Operation 351 can illustrate the initial status of the address mapping data structures prior to an SMU move operation. The metadata management component 113 can receive or otherwise intercept an SMU move operation. The SMU move operation can reference an LSMU, shown as move LSMU (MLSMU) in FIG. 3. In the L2P mapping table 330, MLSMU is mapped to a source PSMU (SPSMU). In the P2L mapping table 300, the source PSMU (SPSMU) is mapped to the MLSMU. The table entry in the P2L mapping table 300 for the SPSMU has a status 306 "N," a base 308 "A," and boundary 310 "T." The destination PSMU (DPSMU) in the P2L mapping table 300 is unmapped, and has a status 306 "N," a base 308 "B," and boundary 310 "T." Status "N" can indicate that the L2P table entry is not associated with an SMU move operation.

At operation 352, in response to receiving an SMU move instruction, the metadata management component 113 can update the status 306 of the P2L mapping table 300 table entry corresponding to the SPSMU referenced by the SMU move. The metadata management component 113 can update the status 306 to "S," indicating that the SPSMU is involved in an SMU move as a source address. The metadata management component 113 can perform operation 352 on both the P2L mapping table 300 stored on the one or more volatile memory devices as well as the P2L mapping table stored on the one or more non-volatile memory devices.

In embodiments, as part of operation 352, or immediately following operation 352, the metadata management component 113 can identify the value of the boundary 310 associated with the DPSMU entry, i.e., identify the value of "T." In some embodiments, the metadata management component 113 can reference the MU mapping table or a stripe mapping table to determine whether the boundary is "0" or "1" (i.e., whether the value of "T" is "0" or "1"). By identifying the value of the boundary in the stripe mapping table or MU mapping table, the metadata management component 113 can reverse the binary boundary bit value to the opposite value (i.e., change the boundary from "0" to "1" or vice versa).

At operation 353, the metadata management component 113 can update the P2L mapping table 300 table entry corresponding to the DPSMU. The DPSMU can be mapped to the MLSMU. The statue 306 for the DPSMU is updated to "D," indicating that the DPSMU is involved in an SMU move as a destination address. The base 308 for the DPSMU is updated to base "C." In embodiments, the base is randomly selected from a predefined list of possible bases. Furthermore, the boundary 310 for the DPSMU entry is switched from "T" to "Not T." For example, "T" can represent "0," and "Not T" can represent "1." In embodiments, the metadata management component 113 can perform operation 353 on the P2L mapping table 300 stored on the volatile memory device first, and then perform operation 353 on the P2L mapping table stored on the non-volatile memory device.

In embodiments, immediately after performing operation 353, the metadata management component 113 can cause the SMU move operation to be performed. That is, the metadata management component 113 (or another component within memory sub-system 115) can execute the SMU move operation by moving the data stored at the source physical address to the destination physical address. For example, the metadata management component 113 can begin with the PMU 212 "0" of MU mapping table 240 in FIG. 2 and move the data to the destination PSMU. The metadata management component 113 can then update the boundary 220 of the MU mapping table 240 to the value indicated by the DPSMU entry in P2L mapping table 300 at operation 353 (i.e., "Not T"). More specifically, the metadata management component 113 can read the source PSMU contents one PMU at a time, update the boundary 220 by reversing binary bit value associated with the PMU, and then write the contents to the destination PSMU. The metadata management component 113 can then move to the next PMU and perform the same move operations, until it cycles through the entire MU mapping table 240. In embodiments, as mentioned above, there is an additional level of grouping called stripes, and the metadata management component 113 can move one stripe at a time.

In embodiments, the metadata management component 113 can identify the PMU 212 with which to begin moving data to the destination PSMU using the boundary 220. That is, the metadata management component 113 can be performing these operations following an ungraceful shutdown, in which case some of the PMU 212 in MU mapping table 240 may have already been moved to the destination PSMU. In order to identify which PMUs 212 have already been moved, the metadata management component 113 can scan the MU mapping table 240 to identify which PMU 212 have a boundary 220 that matches the boundary in the P2L mapping table 300 after operation 353, i.e., "Not T." In this case, "Not T" can be "0," and hence the metadata management component 113 can identify the PMU 212 "B+1" as the boundary (because the boundary 220 does not match "Not T"). Hence, metadata management component 113 can begin moving data referenced by PMU 212 "B+1" and continue to "B+2," etc., until the entire SMU has been moved.

At operation 354, once the data has been moved according the SMU move instruction, the metadata management component 113 can update the L2P mapping table 330 to map the MLSMU to the DPSMU. In embodiments, the metadata management component 113 can perform operation 354 on the L2P mapping table 330 stored on the volatile memory device first, and then perform operation 354 on the L2P mapping table stored on the non-volatile memory device.

At operation 355, the metadata management component 113 can update the P2L mapping table 300 table entry for the SPMSU to unmapped, and update the status 306 to "N," indicating that the SPSMU is not involved in an SMU move. In embodiments, the metadata management component 113 can perform operation 355 on the P2L mapping table 300 stored on the volatile memory device first, and then perform operation 355 on the P2L mapping table stored on the non-volatile memory device.

At operation 356, the metadata management component 113 can update status 306 in the P2L mapping table 300 table entry for the DPSMU to "N," indicating that the DPSMU is not involved in an SMU move. The metadata management component 113 can perform operation 356 on both the P2L mapping table 300 stored on the one or more volatile memory devices as well as the P2L mapping table stored on the one or more non-volatile memory devices.

Figure 4:
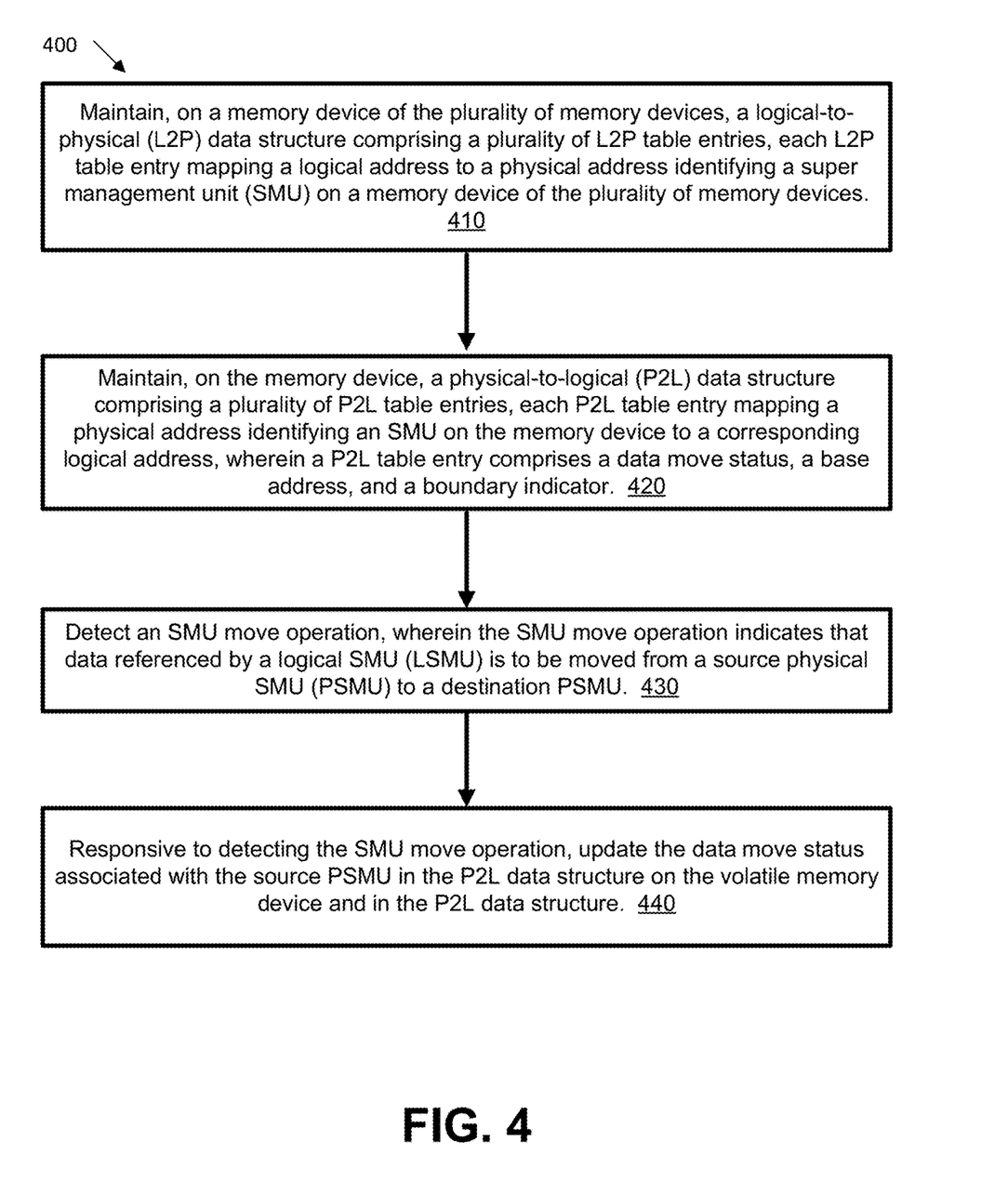
FIG. 4 is a flow diagram of an example method to execute a super management unit move operation, in accordance with some embodiments of the present disclosure.

FIG. 4 is a flow diagram of an example method 400 to execute an SMU move operation, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the metadata management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic maintains, on a memory device of the plurality of memory devices, a logical-to-physical (L2P) data structure comprising a plurality of L2P table entries, each L2P table entry mapping a logical address to a physical address identifying a super management unit (SMU) on a memory device of the plurality of memory devices. In embodiments, the processing logic maintains the L2P data structure on a volatile memory device and on a non-volatile memory device.

At operation 420, the processing logic maintains, on the memory device, a physical-to-logical (P2L) data structure comprising a plurality of P2L table entries, each P2L table entry mapping a physical address identifying an SMU on the memory device to a corresponding logical address, wherein a P2L table entry comprises a data move status, a base address, and a boundary indicator. In embodiments, the processing logic maintains the P2L data structure on the volatile memory device and on the non-volatile memory device.

In some embodiments, the data move status can indicate whether the P2L table entry is involved with an ongoing SMU move operation, and if so, whether it is involved as the source physical SMU or the destination physical SMU. For example, a data move status "N," which can be stored as "00," can indicate that the P2L table entry is not associated with an ongoing SMU move operation. A data move statue "D," which can be stored as "01," can indicate that the P2L table entry is involved in an ongoing SMU move operation as the destination physical SMU. A data move status "S," which can be stored as "10," can indicate that the P2L table entry is involved in an going SMU move operation as the source physical SMU.

At operation 430, the processing logic detects an SMU move operation, wherein the SMU move operation indicates that data referenced by a logical SMU (LSMU) is to be moved from a source physical SMU (PSMU) to a destination PSMU. The SMU move operation can be part of a wear leveling performed by the memory sub-system controller.

At operation 440, responsive to detecting the SMU move operation, the processing logic updates the data move status associated with the source PSMU in the P2L data structure. The processing logic can update the data move status to indicate that the source PSMU is associated with the SMU move operation as the source PSMU. For example, the processing logic can update the data move status associated with the source PSMU entry in the P2L data structure to "S," or "10." The processing logic can update the data move status on the P2L data structure stored on both the volatile and non-volatile memory devices.

In embodiments, the processing logic updates, on the volatile memory device and on the non-volatile memory device, the P2L data entry corresponding to the destination PSMU to map to the LSMU. The processing logic can also update, on the volatile memory device and on the non-volatile memory device, the base address of the P2L table entry corresponding to the destination PSMU. The updated based address can be randomly selected from a predefined list of base addresses. The predefined list of base addresses can include all the MU physical addresses included in the PSMU.

The processing logic can also update, on the volatile memory device and on the non-volatile memory device, the data move status of the P2L table entry corresponding to the destination PSMU. The processing logic can update the move status to indicate that the destination PSMU is associated with the SMU move as the destination PSMU. For example, the processing logic can update the data move status associated with the destination PSMU entry in the P2L data structure to "D," or "01."

Furthermore, the processing logic updates, on the volatile memory device and on the non-volatile memory device, a first boundary indicator of P2L table entry corresponding to the destination PSMU. The processing logic can update the first boundary indicator by reversing the binary value of the first boundary indicator. That is, the first boundary indicator can be a 1-bit data field, and hence can store either a "0" or a "1." The processing logic can update the first boundary indicator by inverting the bit, e.g., by reversing the first boundary indicator from a "0" to a "1," or from a "1" to a "0."

In embodiments the processing logic can then cause the SMU move operation to be performed. Performing the SMU move operation can include identifying the plurality of MUs referenced by the source PSMU, and reading the data referenced by each MU in the plurality of MUs. The processing logic can read the data one MU at a time. The processing logic can update a second boundary indicator associated with the MU by reversing a binary value of the second boundary indicator (i.e., by reversing the bit either from a "0" to a "1," or from a "1" to a "0"). The processing logic can then write the data to the destination PSMU. By going through each MU one at a time, reading the data from the source PMU and updating the boundary indicator before writing the data to the destination PSMU, the second boundary indicator effectively keeps track of which MUs have been moved and which haven't.

In some embodiments, responsive to performing the SMU move operation, the processing logic updates, on the volatile memory device and on the non-volatile memory device, the L2P table entry corresponding to the LSMU to map to the destination PSMU. The processing logic further updates, on the non-volatile memory device and on the non-volatile memory device, the P2L table entry corresponding to the source PSMU to unmap the source PSMU. To unmap the source PSMU, the processing logic can update the P2L table entry to map to a default value. Furthermore, the processing logic updates the data move status to indicate that the source PSMU is not associated with the SMU move.

In embodiments, the processing logic updates, on the non-volatile memory device and on the non-volatile memory device, the data move status associated with P2L table entry corresponding to the destination PSMU to indicate that the destination PSMU is not associated with the SMU move. For example, the processing logic can update the data move status to "N," or "00."

Figure 5:
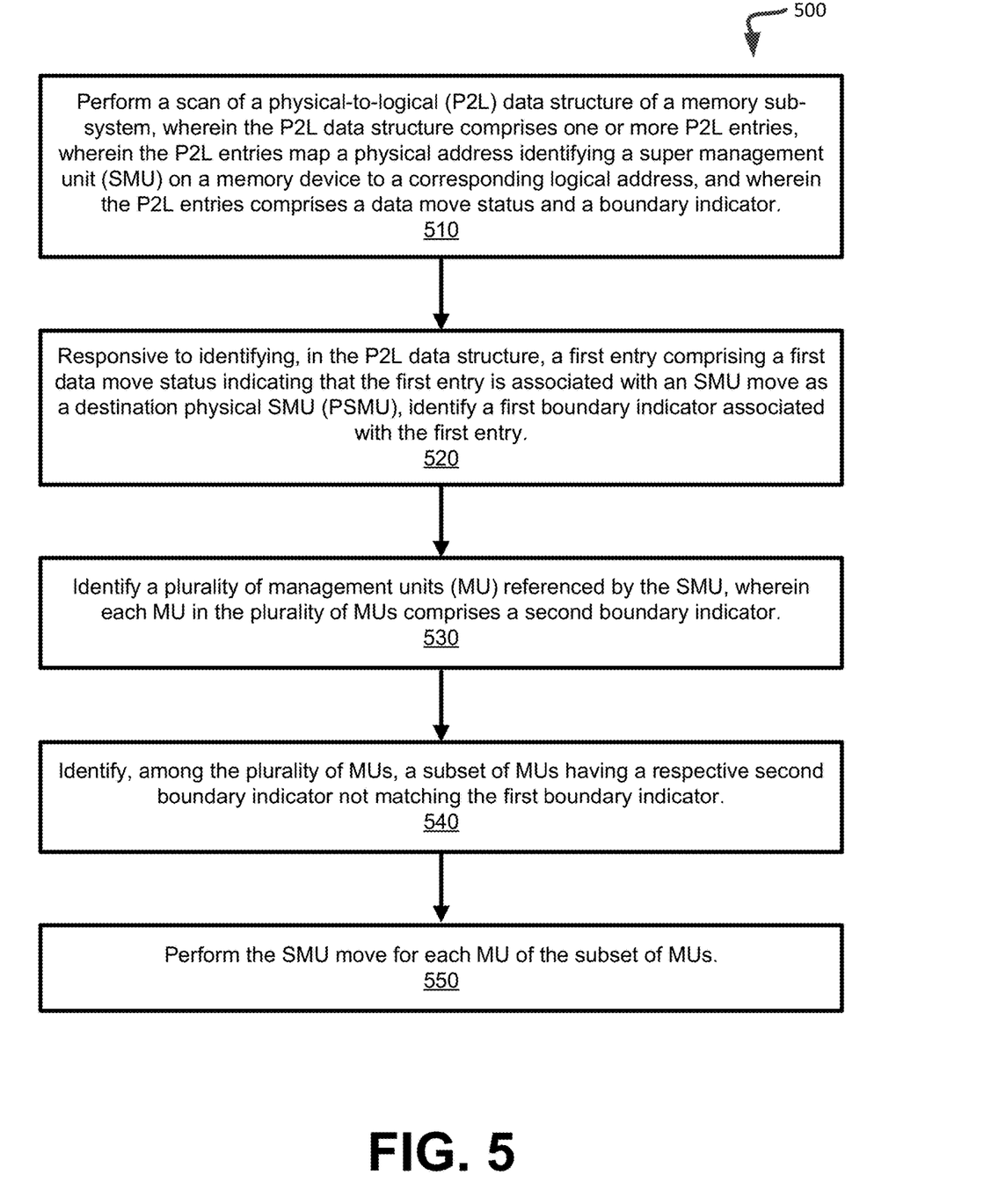
FIG. 5 is a flow diagram of an example method to perform a recovery procedure following an ungraceful shutdown, in accordance with some embodiments of the present disclosure.

FIG. 5 is a flow diagram of an example method 500 to perform a recovery procedure following an ungraceful shutdown, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the metadata management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic performs a scan of a physical-to-logical (P2L) data structure at power-up of a memory sub-system, wherein the P2L data structure comprises one or more P2L entries, wherein the P2L entries map a physical address identifying a super management unit (SMU) on a memory device to a corresponding logical address, and wherein the P2L entries comprises a data move status and a boundary indicator. In some embodiments, the processing logic performs the scan of the P2L data structure at a power-up event. The P2L data structure can be stored on a non-volatile memory device.

In embodiments, the processing logic scans the P2L entries to identify any P2L entries that have a move status indicating that the associated entry is associated with an SMU move as a destination physical SMU. For example, a move status indicating that the P2L entry is associated with an SMU move as a destination PSMU can be status "D," stored as "01." If a P2L entry has a status "D," that indicates that the SMU move operation was in process (i.e., not completed) when the memory sub-system lost power (or when the memory sub-system lost the P2L data structure stored on the volatile memory device).

At operation 520, responsive to identifying, in the P2L data structure, a first entry comprising a first data move status indicating that the first entry is associated with an SMU move as a destination physical SMU (PSMU), the processing logic identifies a first boundary indicator associated with the first entry. In embodiments, as described in examples above, the boundary indicator can be "T" or "Not T." In some examples, a boundary indicator of "T" can represent "1," and a boundary indicator of "Not T" can represent "0." The boundary indicator can identify at which MU within the SMU the SMU move operation stopped.

At operation 530, the processing logic identifies a plurality of management units (MU) referenced by the SMU, wherein each MU in the plurality of MUs comprises a second boundary indicator. In embodiments, the SMU can reference an MU mapping data structure. The entries in the MU mapping data structure can have a second boundary indicator, e.g., either a "0" or a "1," indicating whether the move operation has been performed on the associated MU.

In some embodiments, the MUs are grouped together into stripes, in which case the SMU can reference a plurality of stripes, and each stripe can include a second boundary indicator.

At operation 540, the processing logic identifies, among the plurality of MUs, a subset of MUs having a respective second boundary indicator not matching the first boundary indictor. For example, if the first boundary indicator is "T" (or "1"), the processing logic can identify the MUs in the plurality of MUs referenced by the SMU that have a respective second boundary indicator value of "0."

At operation 550, the processing logic performs the SMU move for each MU of the subset of MUs. Performing the SMU operation can include reading the data referenced by the source PMU, reversing a binary value of the second boundary indicator (i.e., changing it from a "1" to a "0," or vice versa), and writing the data to the destination PMU.

In embodiments, responsive to identifying the first entry in the P2L data structure comprising the data move status indicating that the first table entry is associated with the SMU move as the destination PSMU, the processing logic identifies a logical SMU (LSMU) address associated with the first entry. The processing logic further identifies, in a logical-to-physical (L2P) data structure, a second entry corresponding to the LSMU, and identifies, in the P2L data structure, a third entry corresponding to a PSMU in the second table entry. Responsive to determining that the data move status of a third table entry does not indicate that the LSMU is involved in the SMU move as a source PSMU, the processing logic determines that the P2L table is corrupted and reports an error to the memory sub-system controller. In embodiments, the processing logic can report an error by sending a notification to the memory sub-system controller, e.g., by sending an interrupt.

In some embodiments, the processing logic performs a second scan of the P2L data structure. The processing logic re-scans the P2L data structure to identify any P2L entries that have a data move status indicating that the associated entry is associated with the SMU move as a source PSMU. For example, a data move status indicating that the P2L entry is associated with an SMU move as a source PSMU can be status "S," stored as "10." If a P2L entry has a status "S," that indicates that the SMU move operation was in process (i.e., not completed) when the memory sub-system lost power (or when the memory sub-system lost the P2L data structure stored on the volatile memory device).

Responsive to identifying a second entry in the P2L data structure comprising a second data move status indicating that the second entry is associated with the SMU move as a source PSMU, the processing logic updates the second most status associated with the second entry to indicate that the second entry is not associated with an SMU move. Furthermore, the processing logic identifies a logical SMU associated with the second entry in the P2L data structure. The processing logic can then identify, in the L2P data structure, a third entry corresponding to the LSMU. The processing logic can update the third entry in the L2P data structure to map to the destination PSMU. The processing logic can update second entry in the P2L data structure to unmap the source PSMU.

Figure 6:
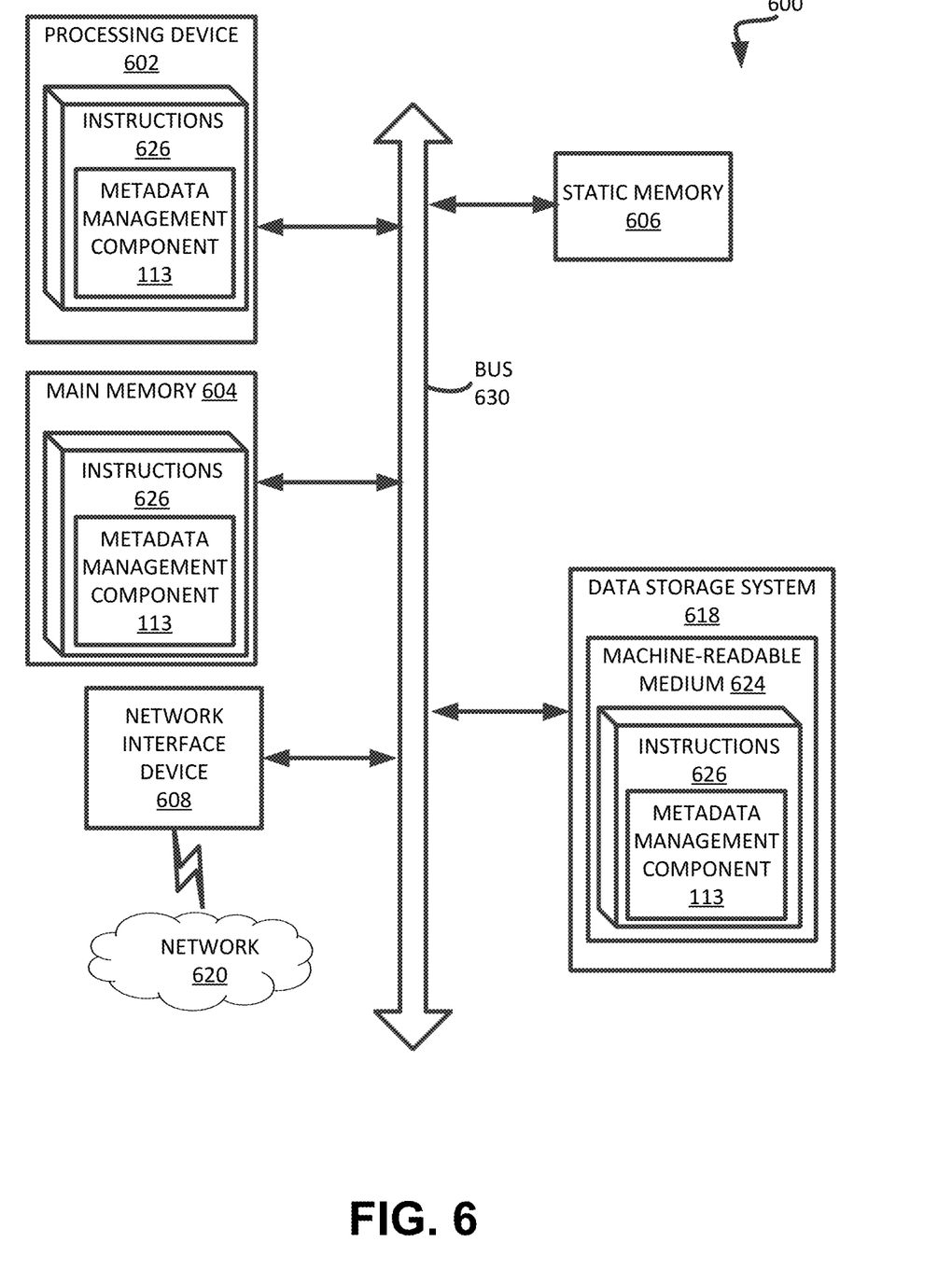
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the metadata management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a metadata management component (e.g., the metadata management component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a plurality of memory devices; and
a processing device, operatively coupled with the memory device, to perform operations comprising:
maintaining, on a memory device of the plurality of memory devices, a logical-to-physical (L2P) data structure comprising a plurality of L2P table entries, each L2P table entry mapping a logical address to a physical address identifying a super management unit (SMU) on another memory device of the plurality of memory devices;
maintaining, on the memory device, a physical-to-logical (P2L) data structure comprising a plurality of P2L table entries, each P2L table entry mapping a physical address identifying a SMU on the another memory device to a corresponding logical address, wherein a source P2L table entry, of the plurality of P2L table entries, comprises a data move status, a base address, and a boundary indicator;
detecting an SMU move operation, wherein the SMU move operation indicates that data referenced by a logical SMU (LSMU) is to be moved from a source physical SMU (PSMU) to a destination PSMU; and
responsive to detecting the SMU move operation, updating the data move status of the source P2L table entry that is associated with the source PSMU in the P2L data structure.

2. The system of claim 1, wherein the memory device is a volatile memory device, and wherein the L2P data structure and P2L data structure are also maintained on a non-volatile memory device.

3. The system of claim 1, wherein the data move status is updated to indicate that the source PSMU is associated with the SMU move operation as the source PSMU.

4. The system of claim 1, wherein the operations further comprise:
updating a P2L table entry, of the plurality of P2L table entries, corresponding to the destination PSMU, wherein the P2L table entry, corresponding to the destination PSMU, is updated to map to the LSMU;
updating base address of the P2L table entry corresponding to the destination PSMU, wherein the updated base address is randomly selected; and
updating data move status of the P2L table entry corresponding to the destination PSMU, the data move status indicating that the destination PSMU is associated with the SMU move as the destination PSMU.

5. The system of claim 1, wherein the operations further comprise:

updating a first boundary indicator of P2L table entry, of the plurality of P2L table entries, corresponding to the destination PSMU by reversing a binary value of the first boundary indicator.

6. The system of claim 1, wherein the operations further comprise:
performing the SMU move operation.

7. The system of claim 6, wherein performing the SMU move operation comprises:
identifying a plurality of MUs referenced by the source PSMU;
reading data referenced by a MU in the plurality of MUs;
updating a second boundary indicator associated with the MU by reversing a binary value of the second boundary indicator; and
writing the data to the destination PSMU.

8. The system of claim 6, wherein the operations further comprise:
responsive to performing the SMU move operation, updating a L2P table entry, of the plurality of L2P table entries, corresponding to the LSMU, wherein the L2P table entry corresponding to the LSMU is updated to map to the destination PSMU; and
updating the source P2L table entry to unmap the source PSMU; and
updating the data move status to indicate that the source PSMU is not associated with the SMU move.

9. The system of claim 8, wherein the operations further comprise:
updating data move status associated with P2L table entry, of the plurality of P2L table entries, corresponding to the destination PSMU, wherein the P2L table entry corresponding to the destination PSMU is updated to indicate that the destination PSMU is not associated with the SMU move.

10. A non-transitory computer-readable storage medium comprising instructions that, when executed by a processing device, cause the processing device to perform operations comprising:
maintaining, on a memory device of a memory subsystem, a logical-to-physical (L2P) data structure comprising a plurality of L2P table entries, each L2P table entry mapping a logical address to a physical address identifying a super management unit (SMU) on another memory device of the memory sub-system;
maintaining, on the memory device, a physical-to-logical (P2L) data structure comprising a plurality of P2L table entries, each P2L table entry mapping a physical address identifying a SMU on the another memory device to a corresponding logical address, wherein a source P2L table entry, of the plurality of P2L table entries, comprises a data move status, a base address, and a boundary indicator;
detecting an SMU move operation, wherein the SMU move operation indicates that data referenced by a logical SMU (LSMU) is to be moved from a source physical SMU (PSMU) to a destination PSMU; and
responsive to detecting the SMU move operation, updating the data move status of the source P2L table entry that is associated with the source PSMU in the P2L data structure.

11. The non-transitory computer-readable storage medium of claim 10, wherein the data move status is updated to indicate that the source PSMU is associated with the SMU move operation as the source PSMU.

12. The non-transitory computer-readable storage medium of claim 10, wherein the processing device is to perform operations further comprising:
   updating a P2L table entry, of the plurality of P2L table entries, corresponding to the destination PSMU, wherein the P2L table entry, corresponding to the destination PSMU, is updated to map to the LSMU;
   updating base address of the P2L table entry corresponding to the destination PSMU, wherein the updated base address is randomly selected;
   updating data move status of the P2L table entry corresponding to the destination PSMU, the data move status indicating that the destination PSMU is associated with the SMU move as the destination PSMU; and
   updating a first boundary indicator of the P2L table entry corresponding to the destination PSMU, by reversing a binary value of the first boundary indicator.

13. The non-transitory computer-readable storage medium of claim 10, wherein the processing device is to perform operations further comprising:
   performing the SMU move operation.

14. The non-transitory computer-readable storage medium of claim 13, wherein the processing device is to perform operations further comprising:
   responsive to performing the SMU move operation, updating a L2P table entry, of the plurality of L2P table entries, corresponding to the LSMU, wherein the L2P table entry corresponding to the LSMU is updated to map to the destination PSMU;
   updating the source P2L table entry to unmap the source PSMU;
   updating the data move status to indicate that the source PSMU is not associated with the SMU move; and
   updating data move status associated with P2L table entry, of the plurality of P2L table entries, corresponding to the destination PSMU, wherein the P2L table entry corresponding to the destination PSMU is updated to indicate that the destination PSMU is not associated with the SMU move.

15. A method comprising:
   maintaining, on a memory device of a memory subsystem, a logical-to-physical (L2P) data structure comprising a plurality of L2P table entries, each L2P table entry mapping a logical address to a physical address identifying a super management unit (SMU) on another memory device of the memory sub-system;
   maintaining, on the memory device, a physical-to-logical (P2L) data structure comprising a plurality of P2L table entries, each P2L table entry mapping a physical address identifying a SMU on the another memory device to a corresponding logical address, wherein a source P2L table entry, of the plurality of P2L table entries, comprises a data move status, a base address, and a boundary indicator;
   detecting an SMU move operation, wherein the SMU move operation indicates that data referenced by a logical SMU (LSMU) is to be moved from a source physical SMU (PSMU) to a destination PSMU; and
   responsive to detecting the SMU move operation, updating the data move status of the source P2L table entry that is associated with the source PSMU in the P2L data structure.

16. The method of claim 15, wherein the memory device is a volatile memory device, and wherein the L2P data structure and P2L data structure are also maintained on a non-volatile memory device.

17. The method of claim 15, wherein the data move status is updated to indicate that the source PSMU is associated with the SMU move operation as the source PSMU.

18. The method of claim 15, further comprising:
   updating a P2L table entry, of the plurality of P2L table entries, corresponding to the destination PSMU, wherein the P2L table entry, corresponding to the destination PSMU, is updated to map to the LSMU;
   updating base address of the P2L table entry corresponding to the destination PSMU, wherein the updated base address is randomly selected; and
   updating data move status of the P2L table entry corresponding to the destination PSMU, the data move status indicating that the destination PSMU is associated with the SMU move as the destination PSMU.

19. The method of claim 15, further comprising:
updating a first boundary indicator of P2L table entry, of the plurality of P2L table entries, corresponding to the destination PSMU by reversing a binary value of the first boundary indicator.

20. The method of claim 15, further comprising:
performing the SMU move operation by:
   identifying a plurality of MUs referenced by the source PSMU;
   reading data referenced by a MU in the plurality of MUs;
   updating a second boundary indicator associated with the MU by reversing a binary value of the second boundary indicator; and
   writing the data to the destination PSMU;
responsive to performing the SMU move operation, updating a L2P table entry, of the plurality of L2P table entries, corresponding to the LSMU, wherein the L2P table entry corresponding to the LSMU is updated to map to the destination PSMU; and
updating the source P2L table entry to unmap the source PSMU;
updating the data move status to indicate that the source PSMU is not associated with the SMU move; and
updating data move status associated with P2L table entry, of the plurality of P2L table entries, corresponding to the destination PSMU, wherein the P2L table entry corresponding to the destination PSMU is updated to indicate that the destination PSMU is not associated with the SMU move.

* * * * *